United States Patent
Fernandez-Galindo et al.

(10) Patent No.: US 10,431,803 B2
(45) Date of Patent: Oct. 1, 2019

(54) TRACTION BATTERY ASSEMBLY HAVING MULTIPIECE BUSBAR MODULE

(71) Applicant: FORD GLOBAL TECHNOLOGIES, LLC, Dearborn, MI (US)

(72) Inventors: Francisco Fernandez-Galindo, Canton, MI (US); Daniel Paul Roberts, Livonia, MI (US); Steven Droste, Ypsilanti, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 44 days.

(21) Appl. No.: 15/670,625

(22) Filed: Aug. 7, 2017

(65) Prior Publication Data
US 2019/0044119 A1 Feb. 7, 2019

(51) Int. Cl.
*H01M 2/20* (2006.01)
*H01M 2/10* (2006.01)

(52) U.S. Cl.
CPC ......... *H01M 2/206* (2013.01); *H01M 2/1077* (2013.01); *H01M 2220/20* (2013.01)

(58) Field of Classification Search
CPC . H01M 2/206; H01M 2/1077; H01M 2220/20
See application file for complete search history.

(56) References Cited

U.S. PATENT DOCUMENTS

| | | | |
|---|---|---|---|
| 9,112,202 B2 | 8/2015 | Park et al. | |
| 2012/0009455 A1* | 1/2012 | Yoon | H01M 10/653 429/120 |
| 2012/0231640 A1* | 9/2012 | Ikeda | H01M 2/1061 439/110 |
| 2013/0164595 A1 | 6/2013 | Takase et al. | |
| 2013/0273404 A1 | 10/2013 | Ochi et al. | |

\* cited by examiner

*Primary Examiner* — Cynthia K Walls
(74) *Attorney, Agent, or Firm* — David Kelley; Brooks Kushman P.C.

(57) ABSTRACT

A traction battery includes cells stacked in an array and having terminals, and endplates sandwiching the array. A busbar module extends between the endplates and includes slots and busbars interleaved along a length of the busbar module. The terminals extend through the slots and connect to the busbars. The busbar module includes a pair of end pieces and a center piece that are separately formed and secured together by connection features.

20 Claims, 6 Drawing Sheets

TRACTION BATTERY ASSEMBLY HAVING MULTIPIECE BUSBAR MODULE

TECHNICAL FIELD

The present disclosure relates to traction battery assemblies for motor vehicles, and more specifically to traction battery assemblies having multipiece busbar modules.

BACKGROUND

Vehicles such as battery-electric vehicles and hybrid-electric vehicles contain a traction battery assembly to act as an energy source for the vehicle. The traction battery may include components and systems to assist in managing vehicle performance and operations. The traction battery may also include high-voltage components, and may include an air or liquid thermal-management system to control the temperature of the battery.

SUMMARY

According to one embodiment, a traction battery includes cells stacked in an array and having terminals, and endplates sandwiching the array. A busbar module extends between the endplates and includes slots and busbars interleaved along a length of the busbar module. The terminals extend through the slots and connect to the busbars. The busbar module includes a pair of end pieces and a center piece that are separately formed and secured together by connection features According to another embodiment, a traction battery includes a cell array having a pair of opposing terminal sides that have a terminal of each cell extending therefrom. Endplates sandwich the array. A pair of busbar modules are each disposed on one of the terminal sides and extends between the endplates. Each busbar module includes a pair of end pieces and a center piece that are separately formed and secured together by connection features.

According to yet another embodiment, a traction battery includes cells stacked in an array and each having a terminal extending from a terminal side of the array. Endplates sandwich the array. A busbar module includes a frame composed of a pair of end pieces and a center piece interconnected by connection features and includes busbars supported on the frame. The frame is disposed on the terminal side such that the terminals extend through the frame to connect to the busbars.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
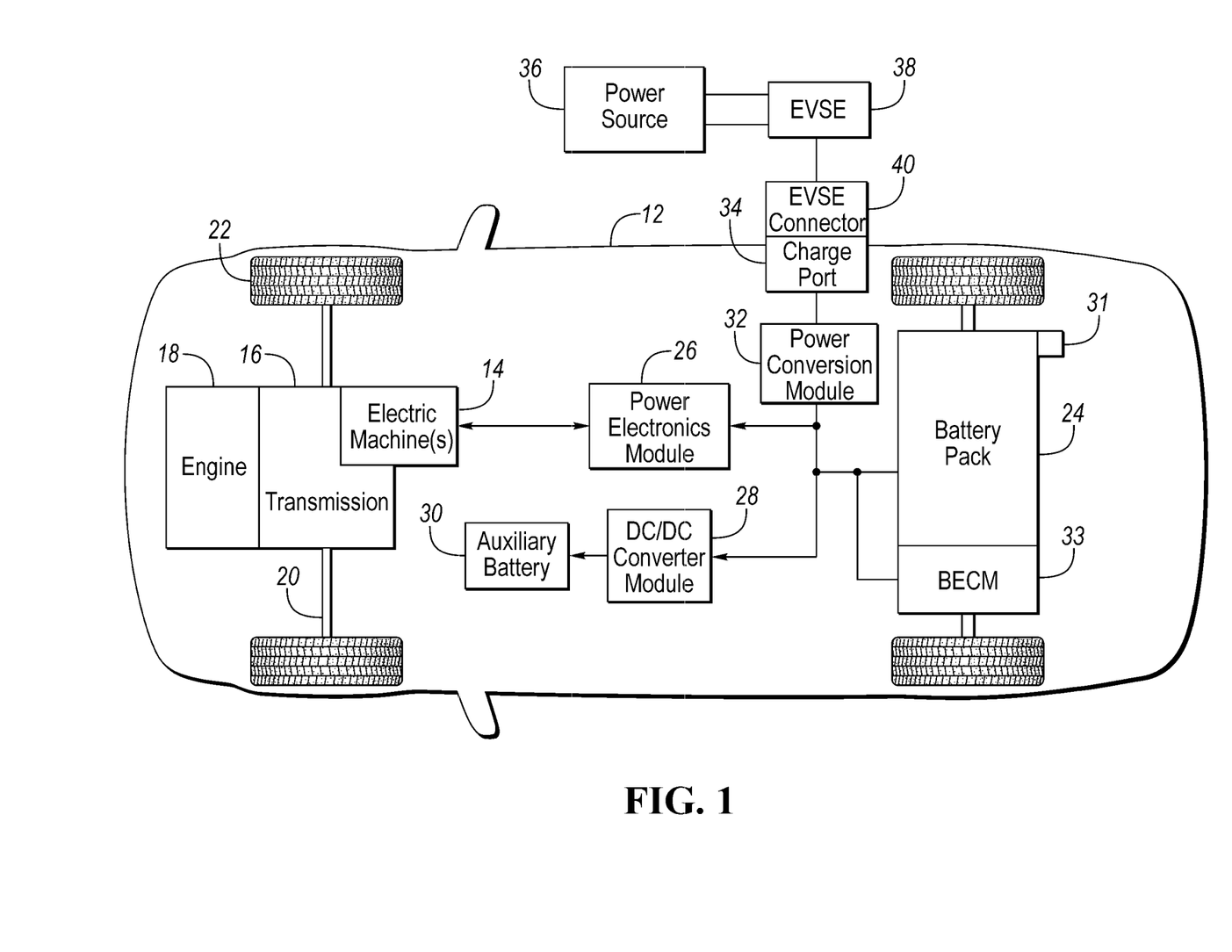
FIG. 1 is a schematic diagram of an example hybrid vehicle.

FIG. 1 depicts a schematic of a typical plug-in hybrid-electric vehicle (PHEV). Certain embodiments, however, may also be implemented within the context of non-plug-in hybrids and fully electric vehicles. The vehicle 12 includes one or more electric machines 14 mechanically connected to a hybrid transmission 16. The electric machines 14 may be capable of operating as a motor or a generator. In addition, the hybrid transmission 16 may be mechanically connected to an engine 18. The hybrid transmission 16 may also be mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy through regenerative braking. The electric machines 14 reduce pollutant emissions and increase fuel economy by reducing the work load of the engine 18.

A traction battery or battery pack 24 stores energy that can be used by the electric machines 14. The traction battery 24 typically provides a high voltage direct current (DC) output from one or more battery cell arrays, sometimes referred to as battery cell stacks, within the traction battery 24. The battery cell arrays include one or more battery cells.

The battery cells, such as a prismatic, pouch, cylindrical, or any other type of cell, convert stored chemical energy to electrical energy. The cells may include a housing, a positive electrode (cathode), and a negative electrode (anode). An electrolyte allows ions to move between the anode and cathode during discharge, and then return during recharge. Terminals may allow current to flow out of the cell for use by the vehicle.

Different battery pack configurations may be available to address individual vehicle variables including packaging constraints and power requirements. The battery cells may be thermally regulated with a thermal management system. Examples of thermal management systems include: air cooling systems, liquid cooling systems, and a combination of air and liquid systems.

The traction battery 24 may be electrically connected to one or more power electronics modules 26 through one or more contactors (not shown). The one or more contactors isolate the traction battery 24 from other components when opened and connect the traction battery 24 to other components when closed. The power electronics module 26 may be electrically connected to the electric machines 14 and may provide the ability to bi-directionally transfer electrical energy between the traction battery 24 and the electric machines 14. For example, a typical traction battery 24 may provide a DC voltage while the electric machines 14 may require a three-phase alternating current (AC) voltage to function. The power electronics module 26 may convert the DC voltage to a three-phase AC voltage as required by the electric machines 14. In a regenerative mode, the power electronics module 26 may convert the three-phase AC voltage from the electric machines 14 acting as generators to the DC voltage required by the traction battery 24. The description herein is equally applicable to fully electric vehicles. In a fully electric vehicle, the hybrid transmission 16 may be a gear box connected to an electric machine 14 and the engine 18 is not present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle components. Other high-voltage loads, such as compressors and electric heaters, may be connected directly to the high-voltage supply without the use of a DC/DC converter module 28. In a typical vehicle, the low-voltage systems are electrically connected to an auxiliary battery 30, e.g., a 12-volt battery.

A battery energy control module (BECM) 33 may be in communication with the traction battery 24. The BECM 33 may act as a controller for the traction battery 24 and may also include an electronic monitoring system that manages temperature and charge state of each of the battery cells. The traction battery 24 may have a temperature sensor 31 such as a thermistor or other temperature gauge. The temperature sensor 31 may be in communication with the BECM 33 to provide temperature data regarding the traction battery 24.

The vehicle 12 may be recharged by a charging station connected to an external power source 36. The external power source 36 may be electrically connected to electric vehicle supply equipment (EVSE) 38. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34.

The various components discussed may have one or more associated controllers to control and monitor the operation of the components. The controllers may communicate via a serial bus, e.g., Controller Area Network (CAN), or via dedicated electrical conduits.

FIGS. 2 through 10 and the related text describe examples of the traction battery assembly 24. Referring to FIGS. 2 through 5, a traction battery assembly 50 includes a plurality of battery cells 54 stacked into a battery array 52. Each of the battery cells 54 may have opposing major sides 56. In the illustrated embodiment, the cells are pouch cells. Terminals 60 extend from the minor sides 58. Each cell 54 may have two terminals 60, e.g., a positive terminal and a negative terminal, with the positive and negative terminals extending from a different minor side 58. Each of the cells 54 may have an associated frame 62 and an associated cooling fin 64. The cooling fins 64 are interleaved with the battery cells 54 such that each cooling fin 64 is disposed against the major sides 56 of an adjacent pair of battery cells 54. The frames 60 support the battery cells 54 within the array 52 and support the cooling fin 64. Each frame 62 may define a pocket 66 for receiving an associated cell 54. Each frame 62 may also include a pair of terminal openings 68 located on the left and right sides to allow the terminals 60 to extend through the frame 62. The array 52 may be formed by first packaging a cell, a fin, and a frame into a cell assembly 69, and then stacking a desired amount of the cell assemblies 69 into an array 52. The array 52 may be held together by a pair of endplates 70, 72 and rods (not shown) that extend through the frames 62. Each endplate 70, 72 is adjacent to a major side 56 of the first or last cell.

Figure 2:
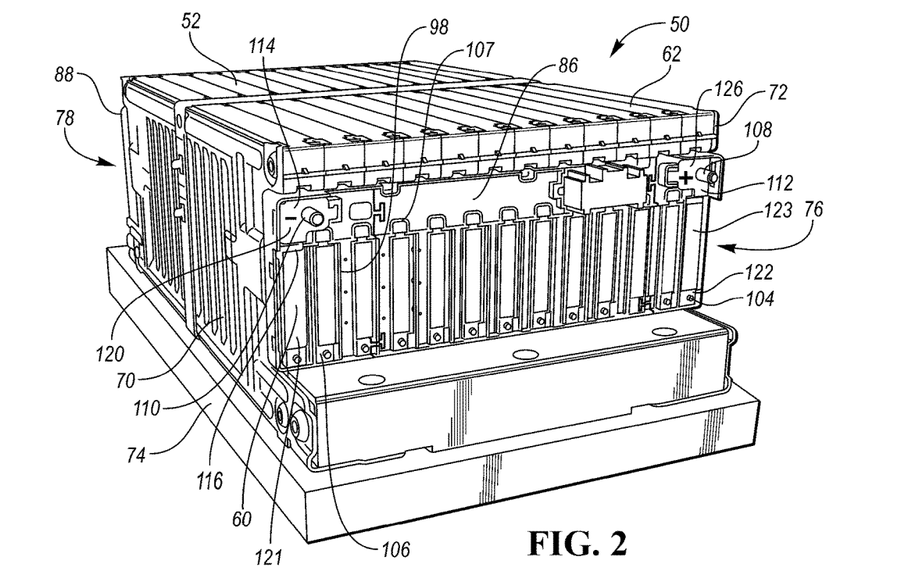
FIG. 2 is a perspective view of a traction battery assembly.
Figure 3:
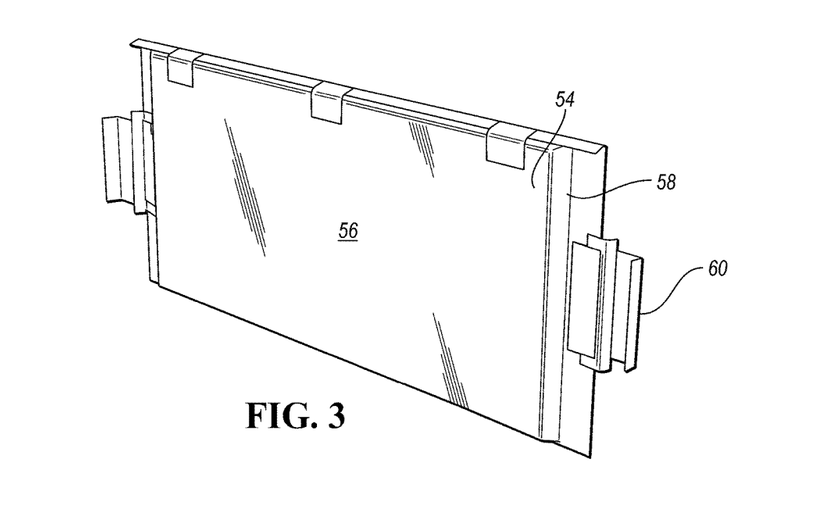
FIG. 3 is a perspective view of a battery cell.
Figure 4:
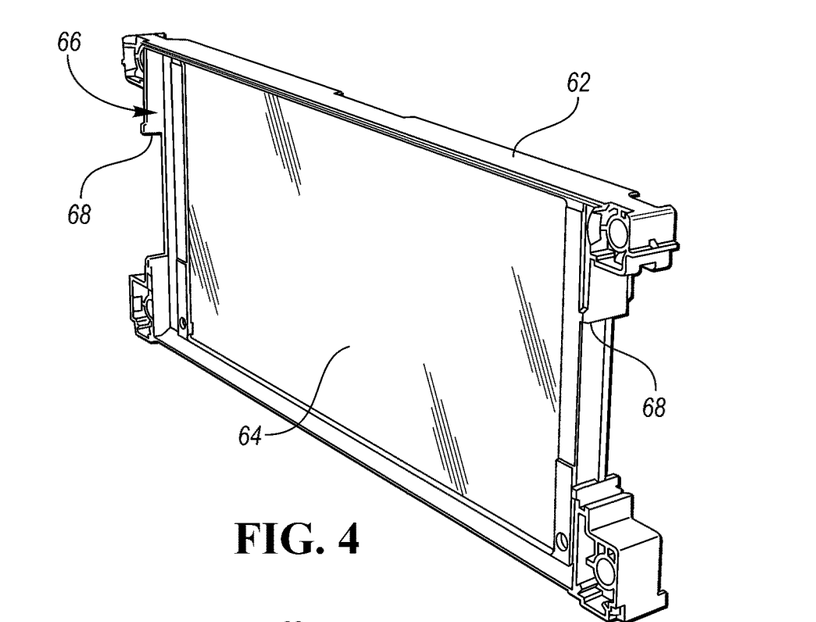
FIG. 4 is a perspective view of a cooling fin assembled to a battery-cell frame.
Figure 5:
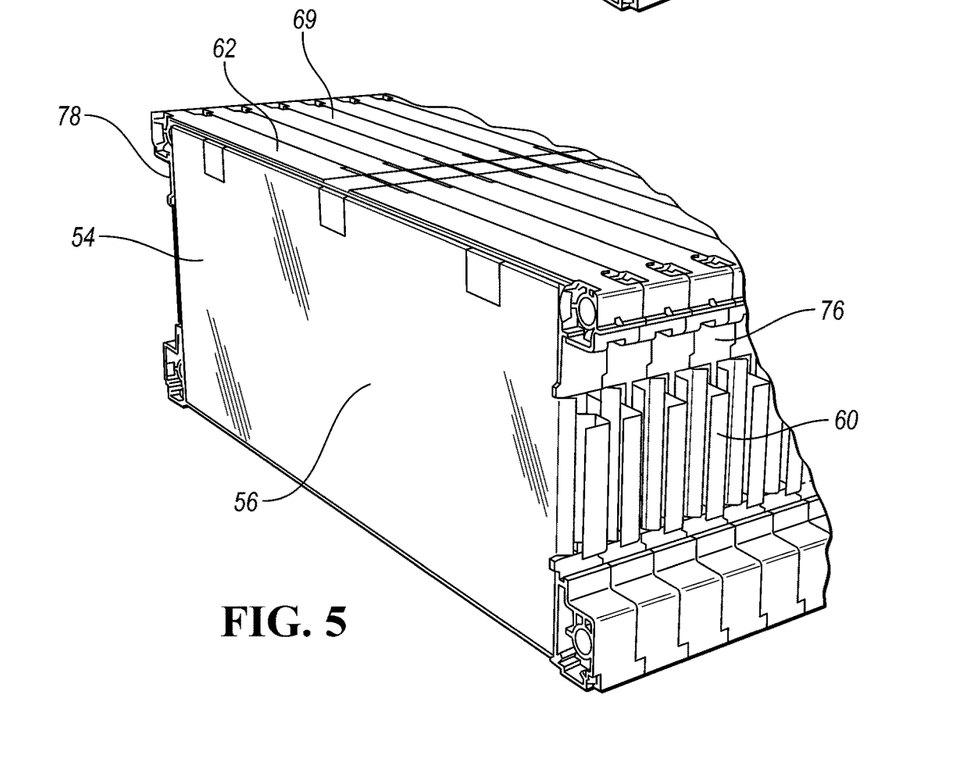
FIG. 5 is a perspective view of a cell array of the traction battery.

The traction battery 50 may include one or more of the above described battery arrays 52 depending upon the power requirements, packaging constraints, the desired electric range of the vehicle, and other factors. The one or more battery arrays 52 are assembled on a substrate such as a cold plate 74. The fins 64 are in contact with the cold plate 74 to transfer thermal energy between the cells 54 and the cold plate 74. The cold plate 74 is part of a thermal management system configured to circulate coolant through an internal structure of the cold plate 74 in order to heat or cool the cells 54 as desired.

The battery array 52 includes at least one terminal side, i.e., the side(s) from which the terminals extend. In the illustrated embodiment, the battery array 52 has a pair of opposing terminal sides 76, 78. The cells 54 in each array 52 may be wired in series, parallel, or a combination thereof. The illustrated battery 52 is shown in series with the terminals 60 on each terminal side 67, 78 alternating positive and negative along a length of the array 52. Select adjacent positive and negative terminals are connected to each other.

Figure 6:
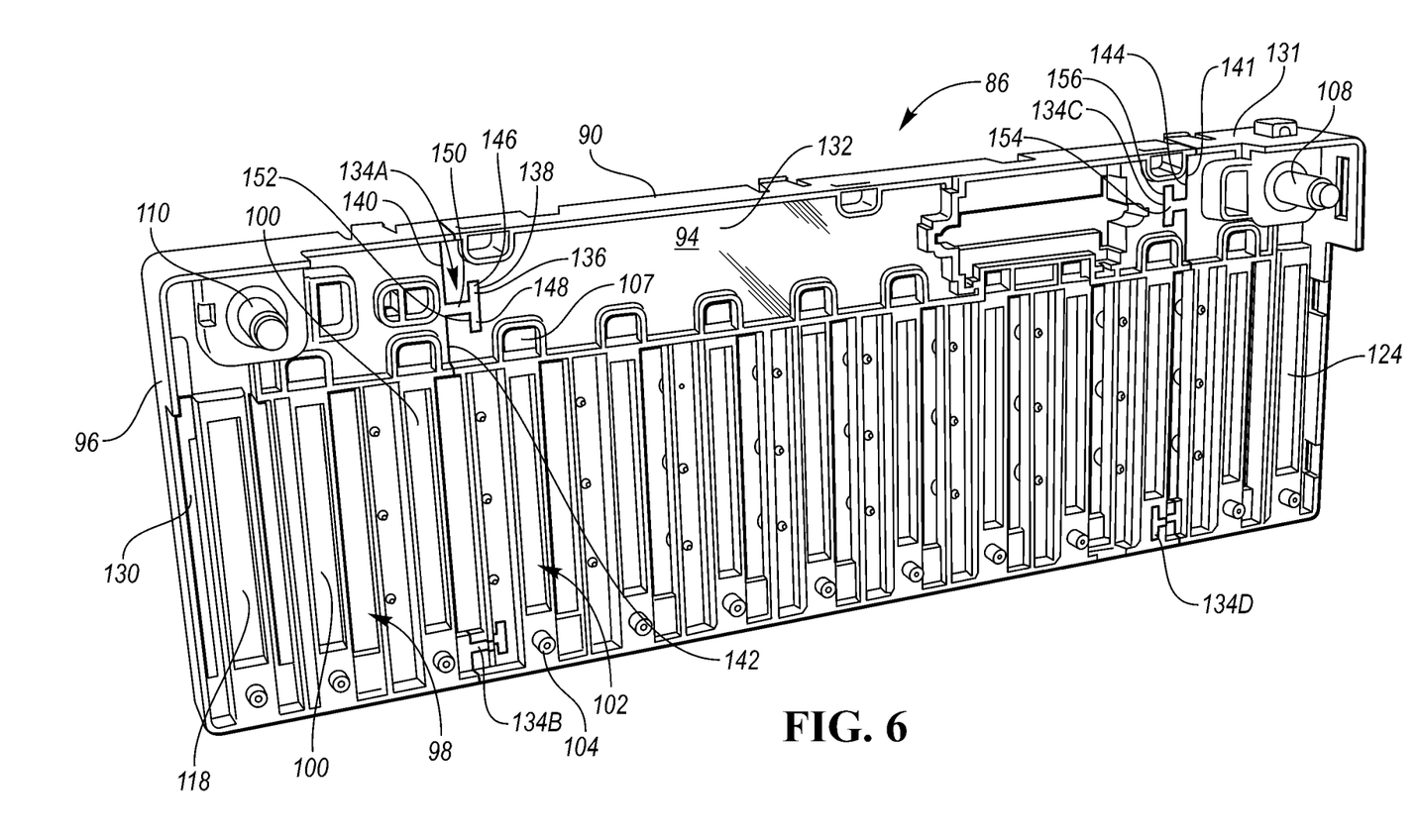
FIG. 6 is a front perspective view of a busbar module of the traction battery having connection features according to one embodiment.
Figure 7:
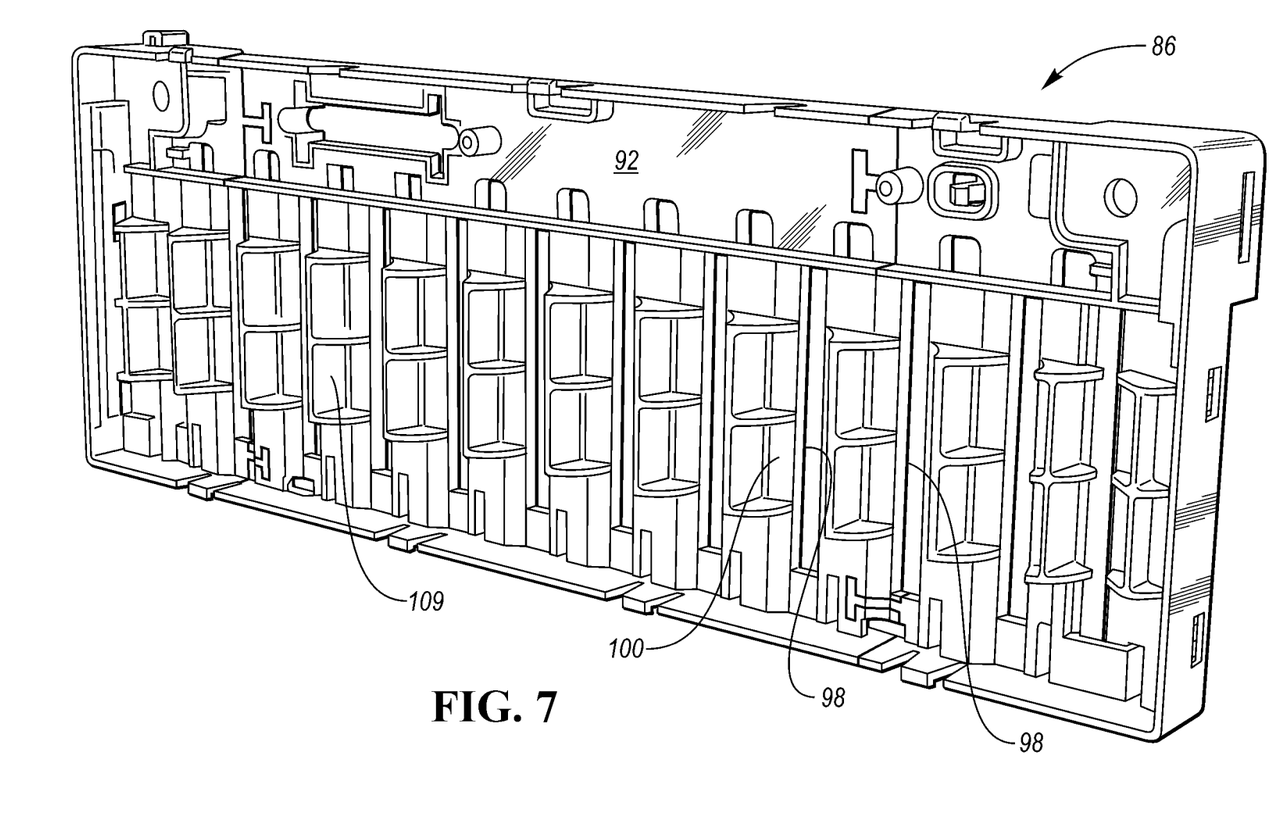
FIG. 7 is a back perspective view of the busbar module of FIG. 6.

Referring to FIGS. 2, 6, and 7, a busbar module 86 may be used to electrically connect select terminals 60. The battery array 52 may include a first busbar module 86 disposed against the terminal side 76 and a second busbar module 88 disposed against the terminal side 78. The busbar module 86 may include a frame 90 that extends between the opposing endplates 70, 72. The frame 90 may be a planar body having an inner face 92 facing the terminal side 76, an outer face 94, and edges 96 extending substantially perpendicular to the faces 92, 94. The frame 90 may define a plurality of slots 98 distributed along a length of the frame 90. The slots 98 may be elongated in a direction that is perpendicular to the length of the frame 90. The frame 90 defines a plurality of busbar-support pillars 100 interleaved with the slots 98. Each of the pillars 100 supports a busbar 106. Each of the pillars 100 may define a pocket 102 configured to receive one of the busbars 106 and a peg 104 extending from a lower end of the pillar 100. The busbars 106 are each received within a respective pocket 102 and define a hole for receiving one of the pegs 104. A head of the pegs 104 may be deformed by heat staking or cold working to secure the busbars 106 to the pillars 100. The upper ends of the busbars 106 may extend through holes 107 allowing the upper end to electrically contact with a circuit board disposed on the inner face 92 of the busbar module 86.

The terminals 60 extend through the slots 98 and are folded over a corresponding one of the busbars 106. The array 52 may be arranged so that one positive terminal and one negative terminal extends through each of the slots 98. The inner face 92 may define guides 109 that direct the terminals 60 into the desired slot 98 as the busbar module 86 is being installed onto the array 52. These pairs of positive and negative terminals are then attached to a corresponding one of the busbars 106 and each other by laser welding or other means known in the art. The second busbar module 88 may also include the above described structure.

The first busbar module 86 may further include a positive output terminal 108 and a negative output terminal 110. These terminals may be electrically connected with other arrays of the traction battery assembly 50 or may be the output terminals of the traction battery 50. A negative output-terminal busbar 114 electrically connects the negative terminal 110 with the array 52. The busbar 114 includes a slender portion 116 connected to the first pillar 118 and a wider portion 120 secured to the negative terminal 110. The negative terminal 121 of the first cell is electrically connected to the slender portion 116. The wider portion 120 may define a hole that receives the terminal 110 therethrough. A positive output-terminal busbar 112 electrically connects the positive terminal 108 with the array 52. The busbar 112 includes a slender portion 122 connected to the last pillar 124 and a wider portion 126 secured to the positive terminal 108. The positive terminal 123 of the last cell is electrically connected to the slender portion 122. The wider portion 126 may define a hole that receives the terminal 108 therethrough.

As stated above, the traction battery assembly 50 may include multiple battery arrays 52. In many instances, packaging restraints cause the number of cells 54 in each of the arrays 52 to be different. For example, the traction battery 50 may include three arrays with two of the arrays having 24 cells and one of the arrays having 32 cells. The cell assemblies 69 may be modular, and thus each of the arrays is nearly the same except for the number of cell assemblies stacked together. By making the cell assemblies 69 modular, tooling costs can be reduced. Tooling costs can further be reduced by making other components of the battery 50 modular such as the busbar modules 86, 88. The length of the busbar modules 86 is dictated by the number of cells 54 in the array. Thus, the busbar modules for a 32-cell array must be longer than the busbar modules for a 24-cell array. If the frames 90 are formed as a single piece each frame will only fit an array have a particular number of cells. On the other hand, if the frames 90 are formed from multiple, modular pieces, at least some of the pieces can be used on arrays having different lengths.

Referring to FIG. 6, in the illustrated embodiment, the first busbar module 86 is composed of a pair of end pieces at 130, 131 and a center piece 132 that are interconnected by connection features 134. Adjacent pieces may be interconnected by a pair of connection features one located near the top and another located near the bottom. Of course, the number of connection features may be increased or decreased, and the location changed depending upon particular design needs. The end pieces 130, 131 are modular and can be used on arrays of different lengths. The center piece 132 may be less modular, in that, the center piece 132 may only fit arrays of a specified length.

The above described three-piece frame reduces the number of connection features 134 required, but also reduces the modularity of the center piece 132. Rather than having a single center piece, the frame 90 may include multiple centerpieces having a specified length. For example, each of the centerpieces may span four cells. The arrays could then be designed to have a cell length in multiples of four. In this embodiment, the centerpieces would be modular. In other embodiments, the frames may be designed to have multiple centerpieces, some of which are modular and some of which are unique to that particular array length.

Each of the connection features 134 may include a projection formed on one of the adjacent pieces and a receptacle formed on the other of the adjacent pieces. For example, a connection feature 134A may include a projection 136 extending from an inner edge 140 of the end piece 130 and a receptacle 138 recessed into a first edge 142 of the center piece 132. The projection 136 may include a neck 150 extending from the edge 140 and a head 146 disposed at a distal end of the neck. The head 146 may include a pair of barbs 148 extending substantially perpendicular to the neck 150. The receptacle 138 is shaped to substantially match the projection 136 and includes a pair of abutments 152 configured to engage with the barbs 148 to secure the projection 136 within the receptacle 138. A second connection feature 134B may be located at a lower portion of the frame 90. The connection features 134A and 134B cooperate to secure the inner edge 140 of the end piece 130 against the first edge 142 of the center piece 132. An inner edge 141 of the end piece 131 may be secured to a second edge 144 of the center piece 132 by connection features 134C and 134D. These connection features may also include a projection 154 that is received within a receptacle 156. The projections 154 and the receptacles 156 may be similar to those described with reference to connection features 134A and 134B. The illustrated connection features 134 may be referred to as a dovetail connection. Other embodiments may utilize other types of connections.

Figure 8:
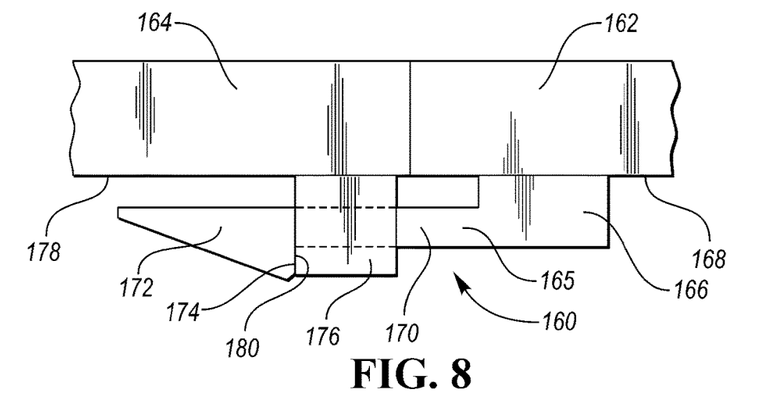
FIG. 8 is a top view of a connection feature according to another embodiment.

FIG. 8 illustrates another type of connection feature that may be used to secure the frame pieces together. A connection feature 160 may be used to connect the first frame piece 162, e.g., an end piece, to a second frame piece 164, e.g., a center piece. The connection feature 160 includes a projection 165 having a base 166 disposed on an outer face 168 of the first piece 162. A neck 170 extends from the base 166 towards the second piece 164. A head 172 is formed on a distal end of the neck 170 and includes a barb 174. The second frame piece 164 has a hoop 176 configured to receive a portion of the projection 165 therein. The hoop 176 is disposed on an outer face 178 of the second piece 164 and cooperates with the outer face 178 to define an opening configured to receive the projection 165. The hoop 176 defines an abutment 180 configured to engage with the barb 174 to resist the head 172 from disengaging with the hoop 176. In other embodiments, snaps, fasteners, adhesive, and the like may be used to connect the pieces together.

Figure 9:
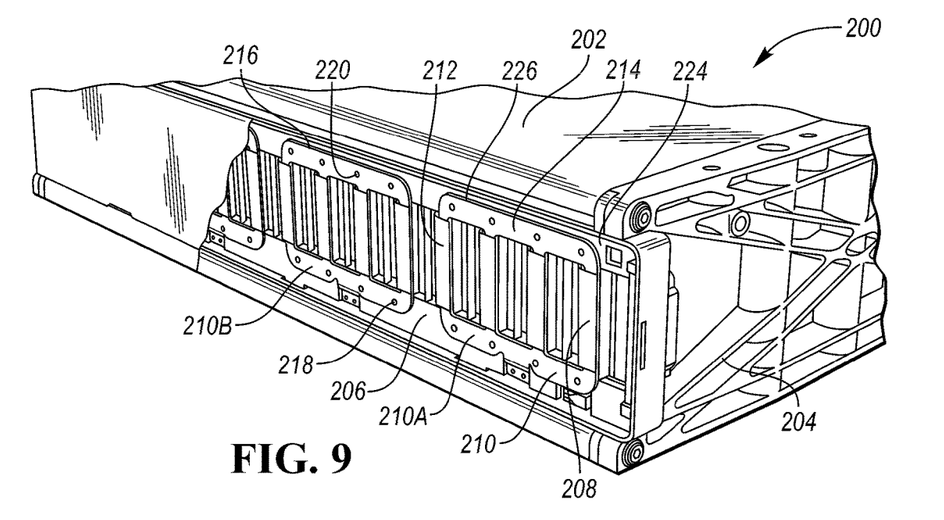
FIG. 9 is a perspective view of another traction battery.
Figure 10:
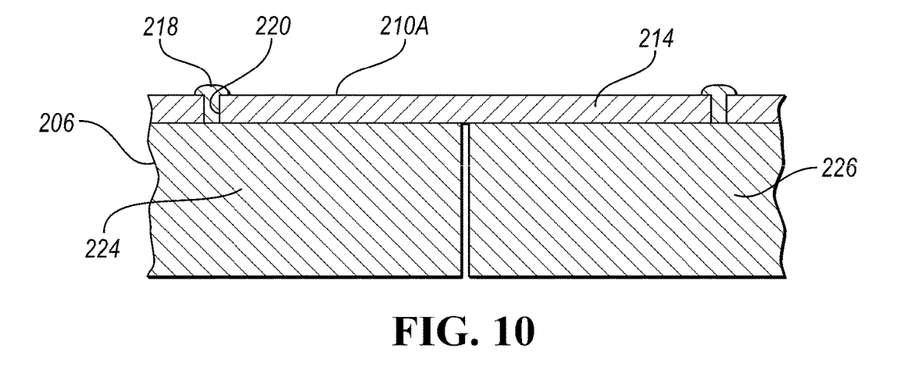
FIG. 10 is partial top cross-sectional view of a busbar module of the traction battery of FIG. 9.

Referring to FIGS. 9 and 10, another traction battery assembly 200 includes a battery array 202 having a plurality of stacked battery cells (not shown). The battery array 202 may be similar to above and have a pair of endplates 204 and a pair of busbar modules 206 extending between the endplates. Terminals 208 of the cells may extend from terminal sides of the array and extend through slots defined in the busbar modules 206.

The battery cells may be connected in series and in parallel. In the illustrated embodiment, a pair of adjacent cells are connected in parallel, and that pair of cells is connected in series with an adjacent pair of cells that are connected in parallel. Busbars 210 electrically connect the cells of the array 202. A busbar 210A may be utilized to connect the first four cells of the array. The busbar 210A may include vertical portions 212 (mostly hidden by cell terminals) and horizontal portions 214 that interconnect the vertical portions 212. Each vertical portion 212 is attached to a terminal 208. For example, the negative terminals of the first and second cells are laser welded to the first and second vertical portions and the positive terminal of the third and fourth cells are laser welded to the third and fourth vertical portions. Additional busbars, e.g., 210B, interconnect other blocks of four cells.

The busbars 210 are supported on a frame 216 of the busbar module 206. The frame 216 defines pegs 218 extending outwardly from an outer face of the module 206. The busbars 210 defined corresponding holes 220 allowing the busbars 210 to be placed on the module 206 with the pegs 218 extending through the holes 220. The head of the pegs 218 may be deformed, via heat staking or cold working, to secure the busbars to the frame 216.

The frame 216 may be composed of multiple pieces and includes at least one end piece 224 and one center piece 226. The end piece 224 and the center piece 226 may be connected together by the busbar 210A rather than utilizing a projection and a receptacle as described above. The horizontal portions 214 of the busbars 210 may span across the interface between the end piece 224 and the center piece 226. The horizontal portions 214 are connected to both the end piece 224 and the center piece 226 by one or more of the pegs 218. Thus, the busbars 210 serve as the connection features to secure pieces of the frame 216 together.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A traction battery comprising:
    a plurality of battery cells, each cell having major sides and a pair of opposing minor sides that each have a positive or negative terminal extending therefrom, wherein the battery cells are stacked in an array with the major sides facing each other, the minor sides forming terminal sides of the array, and the positive and negative terminals alternating along a longitudinal direction of the array;
    endplates sandwiching the array; and
    a busbar module covering one of the terminal sides and extending from one of the endplates to the other of the endplates, the busbar module including:
        a center piece covering middle ones of the battery cells and having first slots and first busbars interleaved along a length of the center piece, wherein the first busbars and the first slots are elongate and extend transverse to the length of the center piece, wherein corresponding ones of the terminals extend through the first slots, with each first slot receiving one of the positive terminals and one of the negative terminals, and connect to the first busbars, and
        an end piece attached to one of the endplates and covering end ones of the battery cells and having second slots and second busbars interleaved along a length of the end piece, wherein the second busbars and the second slots are elongate and extend transverse to the length of the end piece, wherein corresponding ones of the terminals extend through the second slots, with each second slot receiving one of the positive terminals and one of the negative terminals, and connect to the second busbars, wherein the center piece and the end piece are separately formed and secured together by connection features such that the center piece and the end piece are coplanar.

2. The traction battery of claim 1, wherein each of the connections features includes a projection attached to one of the pieces and a receptacle attached to another of the pieces, and the projection is disposed in the receptacle to interlock the pieces.

3. The traction battery of claim 2, wherein the projection includes a barb and the receptacle defines an abutment engageable with the barb.

4. The traction battery of claim 1, wherein the terminals extending though same ones of the slots are attached to same ones of the busbars.

5. The traction battery of claim 1, wherein the busbar module further includes an output terminal and an output-terminal busbar that electrically connects the output terminal with the array.

6. The traction battery of claim 1, wherein the busbar module defines pegs that extend through holes in the busbars to secure the busbars to the busbar module.

7. The traction battery of claim 1, wherein the busbar module defines an inner face disposed against the array and an outer face, and the busbars are disposed on the outer face.

8. The traction battery of claim 1 further comprising a second busbar module covering the other of the terminal sides and extending from one of the endplates to the other of the endplates, the busbar module including:
    a second center piece covering the middle ones of the battery cells and having third slots and third busbars interleaved along a length of the second center piece, wherein the third busbars and the third slots are elongate and extend transverse to the length of the second center piece, wherein corresponding ones of the terminals extend through the third slots, with each third slot receiving one of the positive terminals and one of the negative terminals, and connect to the third busbars, and
    a second end piece attached to one of the endplates and covering the end ones of the battery cells and having fourth slots and fourth busbars interleaved along a length of the second end piece, wherein the fourth busbars and the fourth slots are elongate and extend transverse to the length of the second end piece, wherein corresponding ones of the terminals extend through the fourth slots, with each fourth slot receiving one of the positive terminals and one of the negative terminals, and connect to the fourth busbars, wherein the second center piece and the second end piece are separately formed and secured together by connection features such that the second center piece and the second end piece are coplanar.

9. The traction battery of claim 1, wherein the busbar module further includes a second end piece attached to the other of the endplates and covering other end ones of the battery cells and having third slots and third busbars interleaved along a length of the second end piece, wherein the third busbars and the third slots are elongate and extend transverse to the length of the second end piece, wherein corresponding ones of the terminals extend through the third slots, with each third slot receiving one of the positive terminals and one of the negative terminals, and connect to the third busbars, wherein the center piece and the second end piece are separately formed and secured together by connection features such that the center piece and the second end piece are coplanar.

10. A traction battery comprising:
a plurality of battery cells, each cell having major sides and opposing minor sides that each have a positive or negative terminal extending therefrom, wherein the battery cells are stacked in an array with the major sides facing each other, the minor sides forming terminal sides of the array, and the positive and negative terminals alternating along a longitudinal direction of the array;
endplates sandwiching the array; and
a pair of busbar modules each disposed on one of the terminal sides and extending between the endplates, each busbar module including a pair of end pieces and a center piece that are separately formed and secured together by connection features, wherein each of the connection features includes a projection attached to one of the pieces and a receptacle attached to another of the pieces, and the projection is receivable in the receptacle and configured to interlock with the receptacle.

11. The traction battery of claim 10, wherein the projection includes a barb and the receptacle defines an abutment that engages with the barb.

12. The traction battery of claim 10, wherein each of the busbar modules is a planar body having opposing major sides and edges extending between the major sides, and wherein a first edge of the center piece is disposed against an edge of one of the end pieces, and a second edge of the center piece is disposed against an edge of the other of the end pieces.

13. The traction battery of claim 10, wherein each of the busbar modules further includes a plurality of busbars disposed on an outer major side of the busbar module, and each of the positive and negative terminals is connected to one of the busbars.

14. The traction battery of claim 10, wherein each of the busbar modules further includes slots and each of the terminals extends through one of the slots, wherein each slot receives one of the position terminals and one of the negative terminals therein.

15. A traction battery comprising:
a cell array including a pair of opposing terminal sides that have a terminal of each cell extending therefrom;
endplates sandwiching the array; and
a pair of busbar modules each disposed on one of the terminal sides and extending between the endplates, each busbar module including a pair of end pieces and a center piece that are separately formed and secured together by connection features, wherein at least one of the busbar modules further includes a busbar that spans the center piece and one of the end pieces, and is attached to the center piece and the one of the end pieces by pegs that extend through holes defined in the busbar.

16. The traction battery of claim 14, wherein the slots are elongate and extend transverse to the length of an associated one of the busbar modules.

17. The traction battery of claim 15, wherein the pegs include heads having a larger diameter than the holes.

18. The traction battery of claim 15, wherein the busbar is a first busbar attached to the center piece and the one of the end pieces, and further including a second busbar attached to the center piece and the other one of the end pieces by second pegs that extend through holes defined in the second busbar.

19. The traction battery of claim 15, wherein select ones of the terminals are attached to the busbar.

20. The traction battery of claim 15, wherein the center piece defines slots and select ones of the terminals extend through the slots and connect with the busbar.

* * * * *